United States Patent
Garben

(10) Patent No.: US 7,963,037 B2
(45) Date of Patent: Jun. 21, 2011

(54) FLEXIBLE ROLLER ASSEMBLY

(75) Inventor: Ian Michael Garben, Burnaby (CA)

(73) Assignee: Eastman Kodak Company, Rochester, NY (US)

( * ) Notice: Subject to any disclaimer, the term of this patent is extended or adjusted under 35 U.S.C. 154(b) by 873 days.

(21) Appl. No.: 11/998,237

(22) Filed: Nov. 29, 2007

(65) Prior Publication Data

US 2009/0143209 A1    Jun. 4, 2009

(51) Int. Cl.
*B21K 1/02* (2006.01)
*F16C 13/00* (2006.01)

(52) U.S. Cl. ........... 29/895.2; 29/426.5; 492/45; 492/16

(58) Field of Classification Search ............... 492/6, 7, 492/16, 45; 29/895, 895.2, 426.5
See application file for complete search history.

(56) References Cited

U.S. PATENT DOCUMENTS

| | | | | |
|---|---|---|---|---|
| 3,638,292 A * | 2/1972 | Gaghan | ............ | 492/5 |
| 3,833,980 A * | 9/1974 | Gaghan | ............ | 492/7 |
| 5,127,141 A * | 7/1992 | Roerig et al. | ............ | 492/7 |
| 5,134,928 A * | 8/1992 | Shiota | ............ | 99/620 |
| 5,242,361 A * | 9/1993 | Brown et al. | ............ | 492/7 |
| 7,824,320 B2 * | 11/2010 | Kerschbaumer et al. | ......... | 492/1 |
| 7,850,587 B2 * | 12/2010 | Sano | ............ | 492/6 |
| 2004/0102298 A1 * | 5/2004 | Gerndt et al. | ............ | 492/6 |

* cited by examiner

*Primary Examiner* — Essama Omgba
(74) *Attorney, Agent, or Firm* — Nelson Adrian Blish

(57) ABSTRACT

A compliant roller assembly comprising an elastomeric tube for rolling along a surface, which tube is inherently compliant to irregularities in the surface. Within the tube but smaller than the inner diameter thereof is a core apparatus comprising a non-rotating mounting element supportive of a plurality of idle rollers, extending from the mounting element in the direction of tube travel, the idle rollers making contact with the inner wall of the tube, preferably at a line orthogonal to the contact line of the tube with the surface being rolled. In a preferred embodiment, the core apparatus exerts no force vector toward the surface being rolled, the weight of the elastomeric tube itself exerting sufficient force.

3 Claims, 2 Drawing Sheets

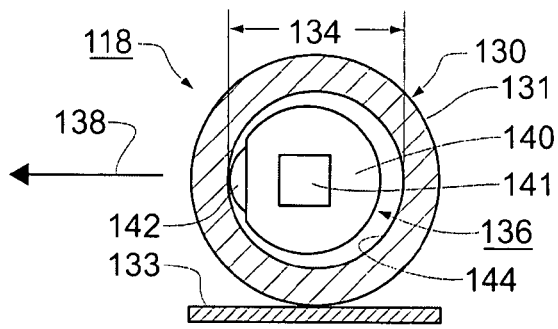
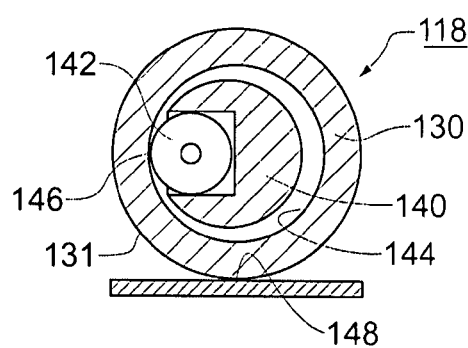
Figure 3
Figure 4
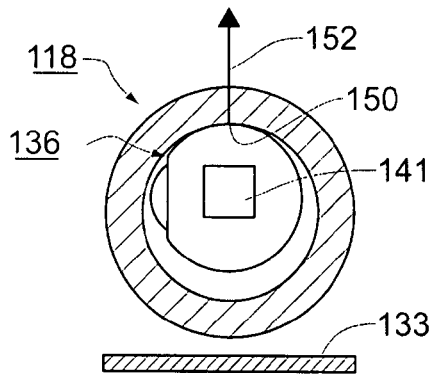
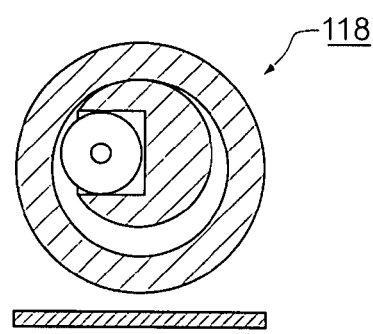
Figure 5
Figure 6
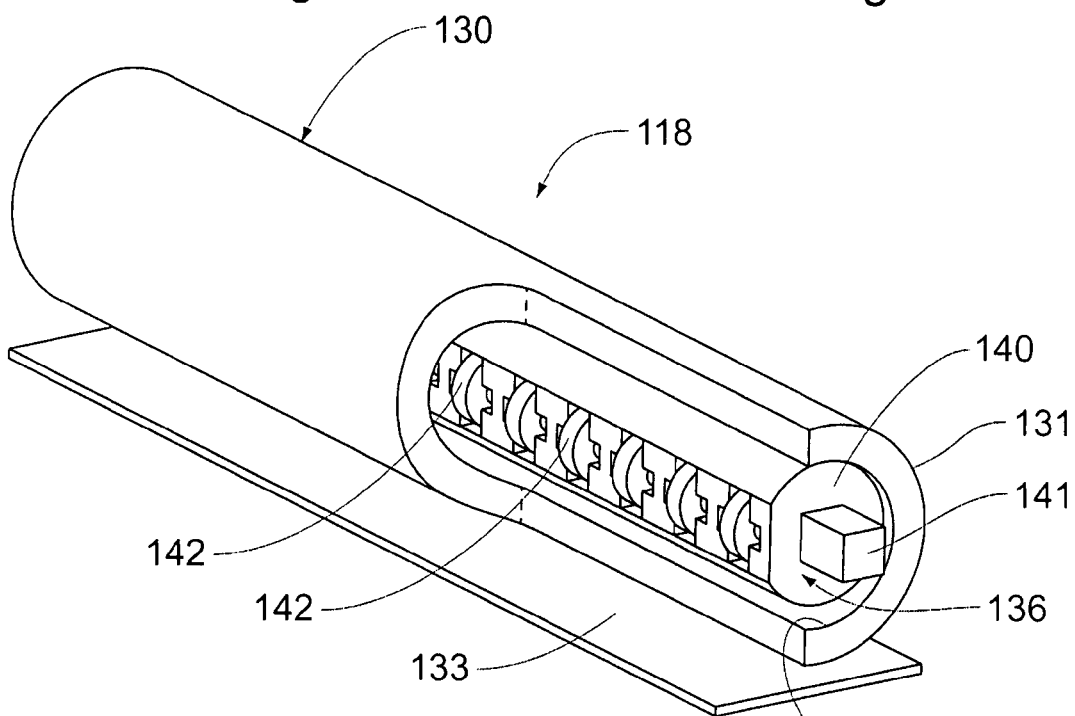
Figure 7

FLEXIBLE ROLLER ASSEMBLY

TECHNICAL FIELD

The present invention relates to rollers for applying pressure to a surface; more particularly, to rollers for applying pressure to uneven surfaces; and most particularly, to a highly compliant roller assembly for providing continuous contact with an uneven surface. A roller assembly in accordance with the present invention is especially useful in imaging machines, wherein flexible sheets incorporating donor material are imaged to impart donor material onto substrates and, after imaging, are removed from the substrates.

BACKGROUND OF THE INVENTION

Color flat panel displays, such as liquid crystal displays and the like, typically incorporate color filters used to provide pixels with color. One technique for fabricating color filters involves a laser-induced thermal transfer process. A particular prior art thermal transfer process is illustrated schematically in FIG. 1. A substrate 10, known in the art as a receiver element, is overlaid with a donor element 12, known in the art as a donor sheet. In the case of color filter fabrication, substrate 10 typically is made of glass and has a generally planar shape. Donor element 12 typically is a sheet that is relatively thin and relatively flexible when compared to substrate 10. Donor element 12 may be made of plastic, for example, and incorporates a transferable donor material (not shown) that may comprise a colorant, a pigment, or the like used to fabricate the color filter.

Donor element 12 is exposed to cause donor material to be transferred from selected portions of donor element 12 to substrate 10. Some exposure methods employ one or more controllable lasers 14 to provide one or more corresponding laser beams 16 to induce the transfer of donor material from the imaged regions of donor element 12 to corresponding regions of substrate 10. Controllable laser(s) 14 may comprise diode laser(s) which are relatively easy to modulate, are relatively low cost, and are relatively small in size. Such laser(s) 14 are controllable to directly expose donor element 12.

Once the selected regions of donor material have been transferred from donor element 12 to substrate 10, it is necessary to remove the used ("spent") donor element 12 from substrate 10. For example, during typical fabrication of color filters, a first donor element 12 is used to apply one color, such as a red donor material to substrate 10, and the first donor element is then removed; a second donor element 12 is used to apply, for example, green donor material, and the second donor element is then removed; a third donor element 12 is used to apply, for example, blue donor material, and the third donor element is then removed.

In some instances, at the conclusion of each imaging process, the transferred donor material partially adheres to substrate 10 but also remains partially adhered to donor element 12. Such partial adherence of the donor material to both substrate 10 and donor element 12 can interfere in removing donor element 12 from substrate 10.

In a prior art technique, donor element 12 is removed from substrate 10 using a roller 18 incorporating one or more suction features 20. Roller 18 is brought into proximity of edge 12A of donor element 12 (as shown by arrow 19) and then suction is applied through Suction features 20, such that edge 12A of donor element 12 is secured to suction features 20. Roller 18 is then rotated (as shown by arrow 22) and translated (as shown by arrow 24) thereby to peel spent donor element 12 from substrate 10 and to wind spent donor element 12 onto the circumferential surface 18A of roller 18.

It has been found that the quality of color filters produced by the above process is a function of the contact pressure between peel roller 18 and donor element 12. In some instances, prior art peel roller 18, having a rigid core, is unable to provide sufficiently uniform pressure across its contact line with donor element 12 because of small irregularities on the chuck and support tables of the imaging engine.

What is needed in the art is a highly compliant peel roller that can apply gentle but substantially uniform pressure at all points of contact with the donor element despite such irregularities in the substrate.

It is a primary object of the invention to apply uniform pressure to a surface being traversed by a roller despite irregularities in such a surface.

SUMMARY OF THE INVENTION

Briefly described, a highly compliant roller assembly in accordance with the present invention comprises an elastomeric tube for rotating about an axis and rolling along a surface, which tube is of sufficiently low durometer as to be inherently compliant to irregularities in the surface. The tube may or may not include suction features as is known in the art. Within the tube but smaller in diameter than the inner diameter of the tube is a core apparatus connected to means, either mechanical or manual, for moving the core apparatus parallel to the surface to cause the elastomeric tube to roll along the surface. The core apparatus comprises a non-rotating mounting element supportive of a plurality of idle rollers mounted for rotation about an axis different from the axis of the elastomeric tube and extending from the mounting element in the general direction of tube travel such that the idle rollers make contact with the inner wall of the elastomeric tube, preferably along a line approximately orthogonal to the contact line of the outer wall of the tube with the surface being rolled. In a preferred embodiment, the core apparatus exerts no force vector toward the surface being rolled, the weight of the elastomeric tube itself exerting sufficient force. In applications requiring greater contact force, the contact line of the idle rollers may be less than orthogonal to the contact line of the outer wall to create an additional force vector against the surface being rolled by the tube.

BRIEF DESCRIPTION OF THE DRAWINGS

The present invention will now be described, by way of example, with reference to the accompanying drawings, in which:

FIG. 3 is an elevational end view of a roller in accordance with the present invention rolling on a surface;

FIG. 4 is an elevational cross-sectional view of the roller shown in FIG. 3;

FIG. 5 is an elevational end view of the roller shown in FIG. 3 being lifted from a surface;

FIG. 6 is an elevational cross-sectional view of the roller shown in FIG. 5; and FIG. 7 is a partial cut-away perspective view of the roller shown in FIG. 3.

DETAILED DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded as illustrative rather than restrictive.

Figure 1:
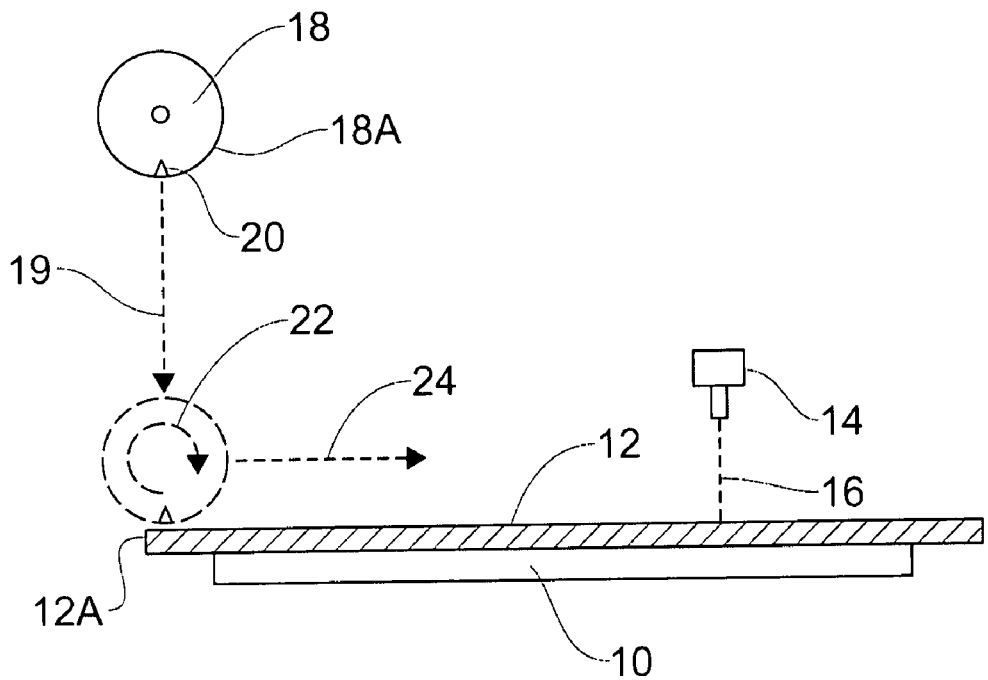
FIG. 1 schematically illustrates a prior art thermal transfer imaging process, used to transfer donor material from a donor element to a substrate during the fabrication of a color filter, and a technique for removing the spent donor element from the substrate.

Referring to FIG. 1, a prior art roller 18 having one or more suction ports 20 has been described above.

Figure 2:
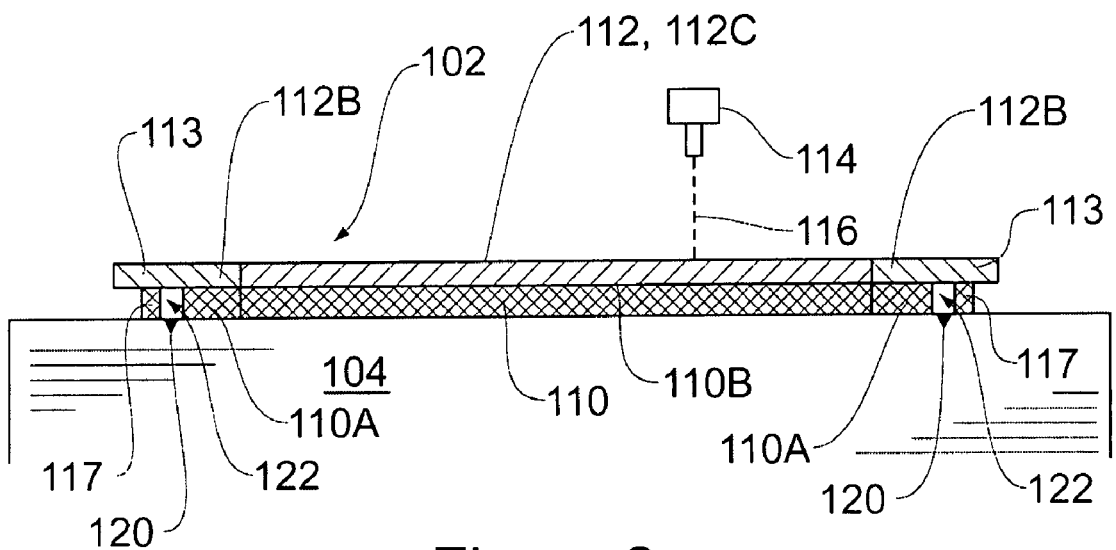
FIG. 2 schematically illustrates an example thermal transfer imaging process.

FIG. 2 schematically depicts a donor element 112 and a substrate 110 used in a thermal transfer imaging process. In FIG. 2, the thermal transfer imaging process takes place on a planar imaging apparatus 102 which may be referred to as a "flatbed" imaging apparatus. In flatbed imaging apparatus 102, substrate 110 is secured to table 104. As is known in the art, there are a variety of techniques for securing substrate 110 to table 104. Donor element 112 is then laid atop substrate 110. To preserve image quality, it is desirable that donor element 112 be prevented from moving with respect to substrate 110 during imaging. In the illustrated embodiment, table 104 comprises stands 117 which are transversely spaced apart from the edges of substrate 10 and which have heights that are substantially similar to the thickness of substrate 110. Table 104 also comprises one or more suction features 120 which apply suction in the space 122 between stands 117 and substrate 110. This suction secures donor element 112 to substrate 110. It will be appreciated by those skilled in the art that there are other additional and/or alternative techniques for securing donor element 112 to substrate 110 and the invention should be understood to accommodate such additional and/or alternative donor element securing techniques.

The transfer of donor material from donor element 112 to substrate 110 may be implemented using a variety of techniques, such as laser-induced thermal transfer, for example. Examples of laser-induced thermal transfer processes in conjunction with which the invention may be used include: laser-induced "dye transfer" processes, laser-induced "melt transfer" processes, laser-induced "ablation transfer" processes, and laser-induced "mass transfer" processes.

In the illustrated embodiment, donor material (not shown) is image-wise transferred from donor element 112 to substrate 110 by a thermal transfer process using one or more controllable laser(s) 114 which generate one or more corresponding laser beam(s) 116. Laser(s) 114 may be controlled by a controller (not shown).

In general, the make-up of substrate 110, donor element 112, and the donor material depend on the particular imaging application. In particular embodiments, imaging apparatus 102 is used to fabricate color filters for flat panel displays on substrate 110. In such embodiments, substrate 110 is typically made of a transparent material (e.g. glass), donor element 112 is typically made of plastic and the donor material (also known as the "image-forming material") typically comprises one or more colorants. Such colorants may include suitable dye-based or pigment-based compositions, for example. The donor material may also comprise one or more suitable binder materials.

To image substrate 110, relative movement is created between laser(s) 114 and table 104. Such relative movement may be effected by a variety of techniques and apparatus (not shown) which are known in the art. Such relative movement may involve moving table 104 and/or laser(s) 114 and such relative movement may be controlled by controller (not shown). In the illustrated embodiment, the relative movement between laser(s) 114 and table 104 and/or the operation of laser(s) 114 is constrained such that laser(s) 114 impinge on region 112C of donor element 112. Consequently, region 112B of donor element 112 remains as a non-imaged area and may, in some cases, provide a border around imaged region 112C. Accordingly, in the illustrated embodiment, donor material is only transferred from donor element 112 onto imaged region 110B of substrate 110 and not into non-imaged region 110A of substrate 110. In the illustrated embodiment, portions 113 of non-imaged region 112B overhang substrate 110 and are supported by stands 117. At the conclusion of the imaging process, donor element 112 is removed from substrate 110.

Referring to FIGS. 3 and 4, a highly compliant roller assembly 118 in accordance with the present invention comprises an elastomeric tube 130 for rolling along a surface 133, which tube is of sufficiently low durometer as to be inherently compliant to irregularities in substrate surface 133. For example, 15 to 50 shore A hardness may be suitable in certain applications. Tube 130 may be formed, for example, of a polyurethane, natural rubber, or a synthetic rubber polymer such as polyisoprene, which may be extruded or cast in known fashion. Other suitable elastomers will occur to those of ordinary skill in the elastomer arts. Preferably, tube outer wall 131 is smooth. The thickness of the tube will vary depending on the material used and the particular application. For example, a thickness of 10 to 50 mm will work for some applications.

Within tube 130 but smaller in diameter than inner diameter 134 of tube 130 is a core apparatus 136 connected to a translating mechanism (not shown) for moving core apparatus 136 in a direction 138 substantially parallel to surface 133 to cause elastomeric tube 130 to roll along surface 133. Because core apparatus 136 is smaller in diameter than the inner diameter 134 of tube 130, tube 130 is free to flex and/or compress locally as may be necessary to follow and maintain contact with irregularities in surface 133. As best shown in FIG. 7, core apparatus 136 comprises a non-rotating mounting element 140 supportive of a plurality of idle rollers 142 axially spaced apart along the length of mounting element 140 and extending from mounting element 140 in the general direction 138 of tube travel such that idle rollers 142 make contact with inner wall 144 of elastomeric tube 130, preferably along a line 146 approximately orthogonal to the contact line 148 of outer wall 131 with surface 133 being rolled upon. The idle rollers 142 are preferably spaced at regular intervals along mounting element 140. It would also be possible to have one long idle roller extending substantially along the length of the elastomeric tube 130. The idle rollers 142 could be made of, for example, stainless steel, brass or plastic or other suitable materials. The spacing of the idle rollers 142 depends on the configuration and materials, but, generally, the closer the idle rollers 142 are spaced from one another, the better when using a soft elastomeric tube 130. In one example embodiment, the idle rollers 142 have a diameter of approximately half the outer diameter of the elastomeric tube 130. The ratio of the outer diameter of the elastomeric tube 130 to the diameter of the idle rollers 142 could be, for example, in the range of between 10 to 1 and 2 to 1. The idle rollers 142 are preferably mounted on ball bearings, although other mounting techniques are possible. Mounting element 140 preferably is provided with a feature 141, such as a boss or other feature, at each end for mounting core apparatus 136 to the translating mechanism.

In a preferred embodiment, core apparatus 136 exerts no force vector toward surface 133, the weight of elastomeric tube 130 itself exerting sufficient force.

Referring to FIGS. 5 and 6, when it is desired to lift roller assembly 118 from Surface 133, core apparatus 136 is lifted by motion of the translating apparatus (not shown) at boss 141 into contact with inner wall 144 at a lifting contact line 150. After the engagement of core apparatus 136 with elastomeric tube 130 at lifting line 50, further motion of the translating apparatus serves to lift assembly 118 clear of surface 133 in direction 152 to allow for the removal of the donor sheet from the substrate.

As will be apparent to those skilled in the art in light of the foregoing disclosure, many alterations and modifications are possible in the practice of this invention without departing from the spirit or scope thereof.

What is claimed is:

1. A method for removing a donor sheet, having a surface, from a substrate, the method comprising:
   a) providing an elastomeric tube, the elastomeric tube having an inner diameter, an inner wall, an outer wall and an axis of rotation;
   b) providing a core apparatus disposed within the elastomeric tube and having a diameter less than the inner diameter of the elastomeric tube, the core apparatus having a mounting element;
   c) attaching the mounting element to a mechanism for translating the core apparatus, and
   d) mounting at least one idle roller for rotation about an axis on the mounting element such that the at least one idle roller is engageable with the inner wall of the elastomeric tube;
   e) translating the core apparatus in a direction generally parallel to the surface to engage the at least one idle roller with the inner wall of the elastomeric tube to cause rotation of the elastomeric tube on the surface to separate the donor sheet from the substrate;
   f) lifting the core apparatus in a direction generally orthogonal to the substrate to remove the donor sheet from the substrate.

2. The method of claim 1 the at least one idle roller and the elastomeric tube are not coaxial.

3. The method of claim 2 wherein the at least one idle roller engages the inner wall of the elastomeric tube when the elastomeric tube is rolling on the surface and the at least one idle roller does not engage the inner wall of the elastomeric tube when the elastomeric tube is not in contact with the surface.

\* \* \* \* \*